June 9, 1942.  P. A. PONTIUS  2,285,679
MOLDED ARTICLE
Filed Feb. 5, 1941
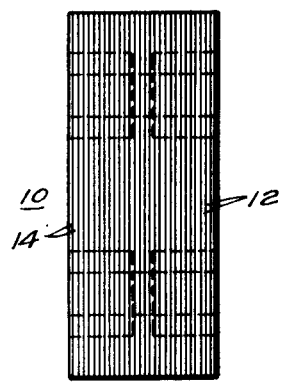
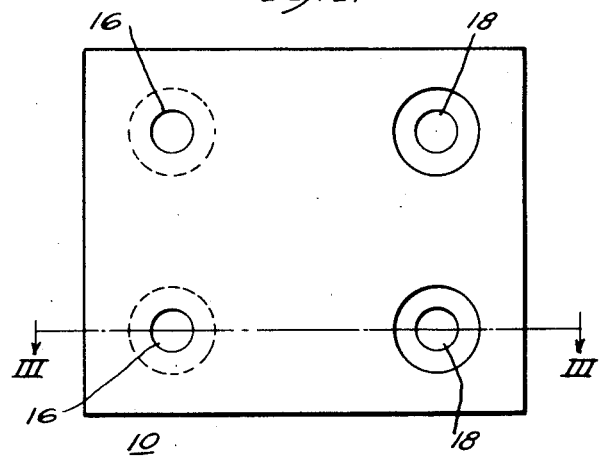
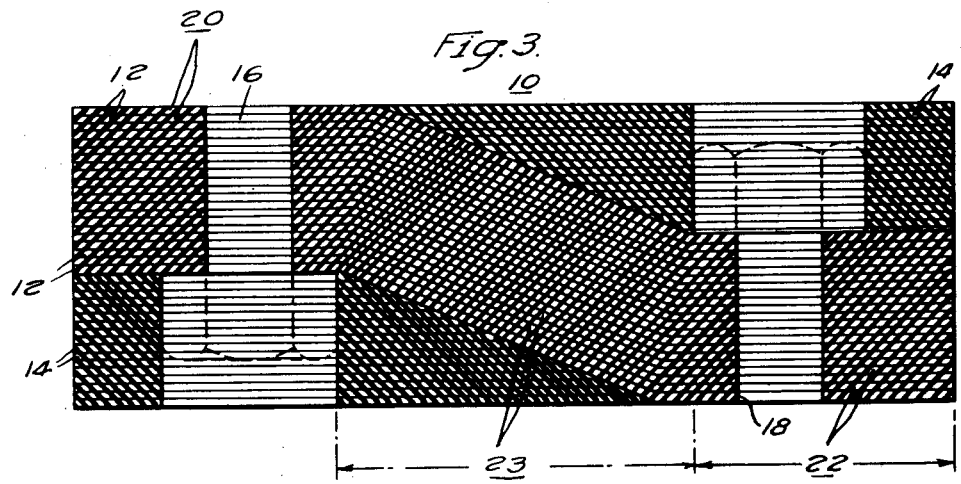
WITNESSES:
E. A. McCloskey
James K. Ely
INVENTOR
Peter A. Pontius.
BY
Ezra W. Savage
ATTORNEY Patented June 9, 1942

2,285,679

UNITED STATES PATENT OFFICE 2,285,679

MOLDED ARTICLE

Peter A. Pontius, East Pittsburgh, Pa., assignor to Westinghouse Electric & Manufacturing Company, East Pittsburgh, Pa., a corporation of Pennsylvania Application February 5, 1941, Serial No. 377,475

4 Claims. (Cl. 154—2)

This invention relates to molded articles and, particularly, to molded articles of fibrous material and a binder.

In molded laminated articles of the type employed as connecting portions of moving parts of different apparatus, stresses are set up under the opposing mechanical forces encountered causing failure of the molded connecting piece by splitting along the laminations of the molded material. The direction of the stresses introduced under the opposing forces can be predetermined.

It is, therefore, an object of this invention to produce a molded article suitable for use as a connecting member which will have the strength necessary for withstanding the stresses and strains introduced therein by the opposing forces to which it is subjected in service.

Another object of this invention is to provide a molded article of fibrous material and a binder therefor which is resistant to splitting under predetermined directional stresses.

A further object of this invention is to provide a molded article of fibrous material and a binder therefor in which at least a part of the fibrous material is of laminated sheets formed into a predetermined shape and consolidated with the remainder of the fibrous material whereby the laminations of predetermined shape extend in and substantially conform to the direction of stress to give an article resistant to splitting.

Other objects of this invention will become apparent from the following description when taken in conjunction with the accompanying drawing, in which:

Figure 1 is a plan view of a molded article embodying the teachings of this invention;

Fig. 2 is an end view of the molded article of Fig. 1; and

Fig. 3 is an enlarged cross sectional view of the molded article of Fig. 1 taken along the line III—III of Fig. 1.

Referring to the drawing, Figs. 1, 2 and 3 illustrate a molded article 10 suitable for use as the insulating connecting block of a circuit breaker (not shown) and which is subjected to offset opposing mechanical forces which introduce predetermined directional stresses in the block. The block 10 is an integral unit formed from any suitable fibrous material and a binder for the fibrous material. The fibrous material may be paper, cotton, silk, rayon, glass fiber, wood, or any other suitable material, while the binder preferred is a synthetic resin of the phenolic, urea or thiourea type or a polyvinyl alcohol resin.

Referring particularly to Fig. 3, there is illustrated a composite article 10 formed from a plurality of laminated sheets 12 of fibrous material molded to a predetermined shape, as will be explained more fully hereinafter and which extend across the article 10. Other laminated sheets 14 are illustrated associated with the laminated sheets 12 of predetermined shape for forming the desired composite article. A suitable resinous binder is associated, being either carried by or impregnating the sheets 12 and 14 of the composite article so that when molded, the fibrous material and the binder associated therewith form an integral article. As illustrated, the consolidated fibrous material and binder may be machined as at 16 and 18 for receiving the bolts employed in securing the block 10 to the parts of the apparatus which it is to connect.

The article 10 may be formed in a number of ways, the criterion of the invention being to form the laminations 12 into a predetermined shape with the sheets extending in and substantially conforming to the direction of the stress lines of the stresses encountered.

In one method of forming the article 10, the sheets 12 of fibrous material such as cloth, paper wood veneer or the like are stacked in laminated relation with a binder associated therewith and are subjected to any of the well known preforming operations under pressure and/or heat to form them into a predetermined shape, depending upon the resinous binder employed and the article in which they are to be employed. In the particular embodiment illustrated, the stacked sheets 12 are formed to have two offset, but substantially parallel, sections 20 and 22, respectively, joined by a connecting section 23. The binder associated with each of the sheets 12 of the preformed stack maintains the laminations in the predetermined shape desired for consolidation with the remainder of the fibrous material and the binder associated therewith.

After the preform has been formed, it is introduced into a suitable mold together with the associated fibrous sheets 14, and is molded into an integral structure under heat and pressure or under pressure alone, depending upon the type of synthetic resin employed as the binder, to give the solid integral structure illustrated having the preformed laminated structure incorporated into the body of the article in substantially the same shape as preformed. Where a synthetic resin of the phenolic, urea or thiourea type is employed, it is necessary to utilize both heat and pressure in molding the composite integral article, whereas if a resin of the polyvinyl alcohol type is employed, only pressure is necessary for obtaining the desired adhesion between the sheets of fibrous material.

In another method of forming the article 10, the fibrous material 14 and laminations 12 are so placed directly in a mold (not shown) that under the molding pressure the sheets 12 are formed to the predetermined shape of the stress lines. The positioning of the fibrous material 14 in the mold of course determines the final shape of the laminations 12 and care must be so exercised in positioning the material in the mold that the laminations 12 in the consolidated unit extend in and substantially conform to the stress lines which are encountered in service.

In the particular rectangular article illustrated where the article is to be employed as the connecting portion between parts of apparatus, it is apparent that each of the parallel portions of the laminated structure of predetermined shape is in a plane which is substantially at right angles to the force applied to the block. In rectangular structures of this type an examination reveals that under opposing offset forces, stresses are set up between the opposing forces at an angle within the body between the points of the applied forces. With the article of this invention, it is found that the laminated structure of predetermined shape embodied as an integral part of the composite molded article has the laminations between the points of applied force extending in and substantially conforming to the direction of the stress lines introduced in the article when opposing offset mechanical forces are applied to the article. By including the laminations extending in and substantially conforming to the direction of the stress lines as an integral part of the article, it is found that a very strong unit is produced which is particularly resistant to splitting between the laminations under the stresses introduced therein by the opposing offset forces.

In all cases in producing the composite molded article of this invention it is preferred that the section of predetermined shape of the composite article be formed from laminated sheets of fibrous material and the binder associated therewith, but it is not necessary to employ laminated fibrous material as the remainder of the fibrous material of the article. Instead of sheets 14 of the fibrous material, there may be employed with equally good results chopped or macerated fibrous material together with a suitable binder therefor, it being found that the laminated section of predetermined shape of the composite article imparts the desired strength to the molded article.

In forming the section of predetermined shape of the composite article, it is desired to utilize the sheets of fibrous material so positioned that the fiber direction of the paper, warp direction of the fabric, or the grain direction of the wood veneer is placed or arranged in substantially the general direction of the stress lines of the predetermined directional stresses which are to be encountered. Where desired, in order to aid in machining the composite article and its application in industry, the laminated section of predetermined shape may be formed with coloring, or some other means for indicating the directions of the fiber, warp, layers of lamination or grain, so that the direction of the section of predetermined shape can be readily ascertained in the composite molded article.

By practicing the teachings of this invention, it is found that a superior product is formed giving a composite molded article which is resistant to splitting under the predetermined directional stresses introduced by opposed offset mechanical forces which are applied to the article.

Although this invention has been described with reference to a particular embodiment, it is, of course, not to be limited thereto except insofar as is necessitated by the prior art and the scope of the appended claims.

I claim as my invention:

1. A molded article for use under opposing forces introducing therein predetermined directional stresses comprising in combination, fibrous material bonded together with a binder material, at least a part of the fibrous material being in sheet form, said sheets being stacked in laminated relation and preformed to a predetermined shape, the binder associated with the sheets maintaining them in the predetermined shape, the fibrous material other than the preformed laminations being disposed adjacent the laminated preform and consolidated therewith to give an integral article of predetermined shape, each of the laminations of the preform being in a plane at the point of applied force which is substantially at right angles to the applied force with the laminations extending in and substantially conforming to the direction of the predetermined directional stresses whereby the article is resistant to splitting under the stresses introduced by the opposing forces.

2. A molded article of substantially rectangular shape for use under opposing offset forces introducing therein predetermined directional stresses comprising in combination, fibrous material bonded together with a binder material, at least a part of the fibrous material being in sheet form, said sheets being stacked in laminated relation with the fibrous material other than said sheets being disposed adjacent thereto and consolidated therewith to give an integral article, the laminations of said sheets in the integral article having a predetermined shape comprising two offset but substantially parallel plane sections and an intermediate connecting section extending in and substantially conforming to the direction of the predetermined directional stresses to give an article resistant to splitting under the stresses introduced by the opposing offset forces.

3. A molded article of substantially rectangular shape for use under opposing forces introducing therein predetermined directional stresses comprising in combination, fibrous material bonded together with a binder material, at least a part of the fibrous material being in sheet form, said sheets being stacked in laminated relation and preformed to a predetermined shape comprising two offset but substantially parallel plane sections and an intermediate connecting section, the laminations of the preform being continuous between the sections, the binder associated with the sheets maintaining them in the preformed shape, the fibrous material other than the preformed laminations being disposed adjacent the laminated preform and consolidated therewith to give a substantially rectangular article in which the preformed laminations extend in and substantially conform to the direction of the predetermined directional stresses whereby the article is resistant to splitting under the stresses introduced by the opposing forces.

4. A molded article for use under a force which introduces predetermined directional stresses therein, comprising in combination, fibrous material bonded together with a binder material, at least a part of the fibrous material being in sheet form, said sheets being stacked in laminated relation and consolidated with the remainder of the fibrous material, said sheets being disposed in the consolidated article at the point where the force is to be applied substantially transverse to the direction of the force, and said sheets extending therefrom substantially in the direction of the predetermined directional stresses to resist splitting under the stresses.

PETER A. PONTIUS.